United States Patent [19]

Nettles et al.

[11] Patent Number: 5,424,823
[45] Date of Patent: Jun. 13, 1995

[54] SYSTEM FOR IDENTIFYING FLAT ORTHOGONAL OBJECTS USING REFLECTED ENERGY SIGNALS

[75] Inventors: James L. Nettles, Arlington; Arthur S. Bornowski, Garland, both of Tex.

[73] Assignee: Loral Vought Systems Corporation, Grand Prarie, Tex.

[21] Appl. No.: 107,957

[22] Filed: Aug. 17, 1993

[51] Int. Cl.⁶ .................. G01C 3/08; G01B 11/30; G06K 9/56
[52] U.S. Cl. .................. 356/5.01; 356/371; 382/203
[58] Field of Search .......... 356/371, 5; 382/27, 382/1; 348/128

[56] References Cited

U.S. PATENT DOCUMENTS

| | | | |
|---|---|---|---|
| 3,459,392 | 8/1969 | Buynak et al. | 244/3.17 |
| 4,162,775 | 7/1979 | Voles | 244/3.17 |
| 4,245,560 | 1/1981 | Rambauske | 102/213 |
| 4,383,663 | 5/1983 | Nichols | 244/3.16 |
| 4,569,078 | 2/1986 | Zuk | 382/1 |
| 4,624,013 | 11/1986 | Urushibata | 382/9 |
| 4,630,306 | 12/1986 | West et al. | 382/21 |
| 4,791,676 | 12/1988 | Flickner et al. | 382/26 |
| 5,088,659 | 2/1992 | Neff et al. | 244/3.16 |
| 5,220,164 | 6/1993 | Lieber et al. | 356/5 |
| 5,243,553 | 9/1993 | Flockencier | 356/5 |
| 5,270,780 | 12/1993 | Moran et al. | 356/5 |
| 5,275,354 | 1/1994 | Minor et al. | 244/3.17 |

FOREIGN PATENT DOCUMENTS 2164427 3/1986 United Kingdom.
2265779 10/1993 United Kingdom.
8603288 6/1986 WIPO.

OTHER PUBLICATIONS

Rosenfeld and Kak, "Digital Picture Processing (vol. 2, 2d edition)," p. 241.
Neter and Wasserman, "Applied Linear Statistical Models," 1974, pp. 214-215, place of publication unknown.
McGraw-Hill Encyclopedia of Science & Technology, (7 ed), 1992, pp. 402-403, place of publication unknown.
U.S. Patent Application Ser. No. 07/724,901 (now abandoned), entitled "Target Classifying Technique," filed Jul. 2, 1991 in the names of Nettles and Han.

*Primary Examiner*—Stephen C. Buczinski
*Attorney, Agent, or Firm*—Arnold, White & Durkee

[57] ABSTRACT

An improved system for using reflected energy signals sensed by light detecting optics to identify flat surfaces that are orthogonal to the detecting optics. A light source generates a laser light beam, the beam is scanned across a target scene, and a reflected signal is sensed by light detecting optics to produce an electrical representation of the reflected signal. The representation is stored in an array in the form of a plurality of data elements. The data elements are sequentially analyzed by comparing the range of each data element with the ranges of a selected number of neighboring elements, and giving the data element under analysis a corresponding "index." Data elements whose ranges closely match neighboring data elements are assigned higher indices. Neighboring data elements with high indices therefore signify proximate points on a flat surface, which is orthogonal to the detecting optics. The data elements may be further analyzed by distinguishing elements with higher indices from those with lower indices, to highlight the flatter, more orthogonal surfaces.

14 Claims, 6 Drawing Sheets

SYSTEM FOR IDENTIFYING FLAT ORTHOGONAL OBJECTS USING REFLECTED ENERGY SIGNALS

BACKGROUND OF INVENTION

1. Field of Invention

The present invention relates to an improved system for processing reflected energy signals such as laser light pulses. More specifically, the invention concerns a system for using reflected energy signals to identify flat, orthogonal surfaces.

2. Description of Related Art

Many different systems are known for acquiring electrical images representative of visual scenes such as landscapes, buildings, military targets, and the like. "Passive" systems are one example of such systems. In passive systems, a detector is used to sense energy produced or reflected from the objects in the scene of interest. One example of a passive system is an infrared sensor that detects heat produced by objects. Alternatively, a light sensor such as an array of photodiodes may be used to sense the ambient light reflected by the objects in the scene. In contrast to passive systems, "active" systems actively generate energy, reflect energy off of the objects, and detect the reflected energy signals.

Passive systems have been utilized widely for quite some time, and many users have found them to be satisfactory for certain applications. However, when considered in other applications, passive systems have been found to have a number of limitations. First of all, it may be difficult to interpret the data provided by passive systems, since a given level of light intensity may indicate an object with low reflectivity, or the same intensity level may indicate a distant object with high reflectivity.

As a result, many users have turned to laser detecting and ranging (LADAR) systems, which employ light detecting equipment to record light signals generated by a laser light source and reflected by one or more objects. Typically, a laser light source transmits laser light signals toward a scene in a pattern such as a raster, star sequence, or circle sequence. Light detecting equipment, which is often co-located with the laser light source, detects light signals that are reflected by the objects and terrain of the scene. With LADAR systems, the range of a distant object is derived from the time the laser light travels to and from the object. Moreover, information related to the hue, orientation, texture, reflectivity, and shape of a distant object may be derived from the intensity of light reflected by the object.

Data collected by a LADAR system is typically processed by an electronic device such as a computer. When LADAR systems are used in targeting applications, such as missile guidance operations, one of the chief goals of such processing is to accurately identify targets, and distinguish them from non-targets. Therefore, engineers involved in the research and development of LADAR-based targeting systems are constantly seeking to improve the ability of such systems to accurately recognize targets.

One approach that has been used with LADAR systems to recognize targets is the "slope-based" technique. In one example of a slope-based technique, a computer identifies flat surfaces by mathematically fitting planes to data points representative of the surfaces. The least squares method is one known means for accomplishing such a fit.

Although the slope-based technique is useful in a number of respects, it is limited in some other ways. In particular, the slope-based technique may be more noise sensitive than some users desire. A problem arises if the slope-based technique is applied to data points that represent a flat surface, but contain one noisy data point that differs substantially from the other points. In this case, the noisy point will skew the computer's attempts to fit a plane to the data points. This is especially true if the least squares fitting method is used, since the difference between the squares of the data points and the square of the noisy point is magnified.

BRIEF SUMMARY OF INVENTION

The present invention concerns an improved system for using reflected energy signals sensed by light detecting optics to identify flat surfaces that are orthogonal to the light detecting optics. A light source generates a laser light beam, scanning the beam across a target scene in a predetermined pattern. Reflected signals are sensed by light detecting optics, which produce an electrical representation of the reflected signals, and direct the representation to a computer processor.

The reflected signals, which contain data representative of the target scene, are stored in an array as a plurality of data elements. Each data element is sequentially analyzed by comparing the range of the data element with the ranges of a selected number of neighboring data elements, and giving the data element under analysis a corresponding "index." Data elements whose ranges closely match neighboring data elements are assigned higher indices. Neighboring data elements with high indices signify proximate points of a flat surface, which is orthogonal to the detecting optics.

The indices of the data elements may be stored in a second array and viewed on a computer display, or further analyzed by distinguishing elements with higher indices from those with lower indices, and storing the results in a third array to highlight the flatter, more orthogonal surfaces. Moreover, a Connected Components algorithm may be applied to the third array to identify contiguous surfaces.

DESCRIPTION OF DRAWINGS

The nature, objects, and advantages of the invention will become more apparent to persons skilled in the art after considering the following detailed description in connection with the accompanying drawings, in which like reference numerals designate like parts throughout, wherein.

DESCRIPTION OF A PREFERRED EMBODIMENT

Structure

Figure 1:
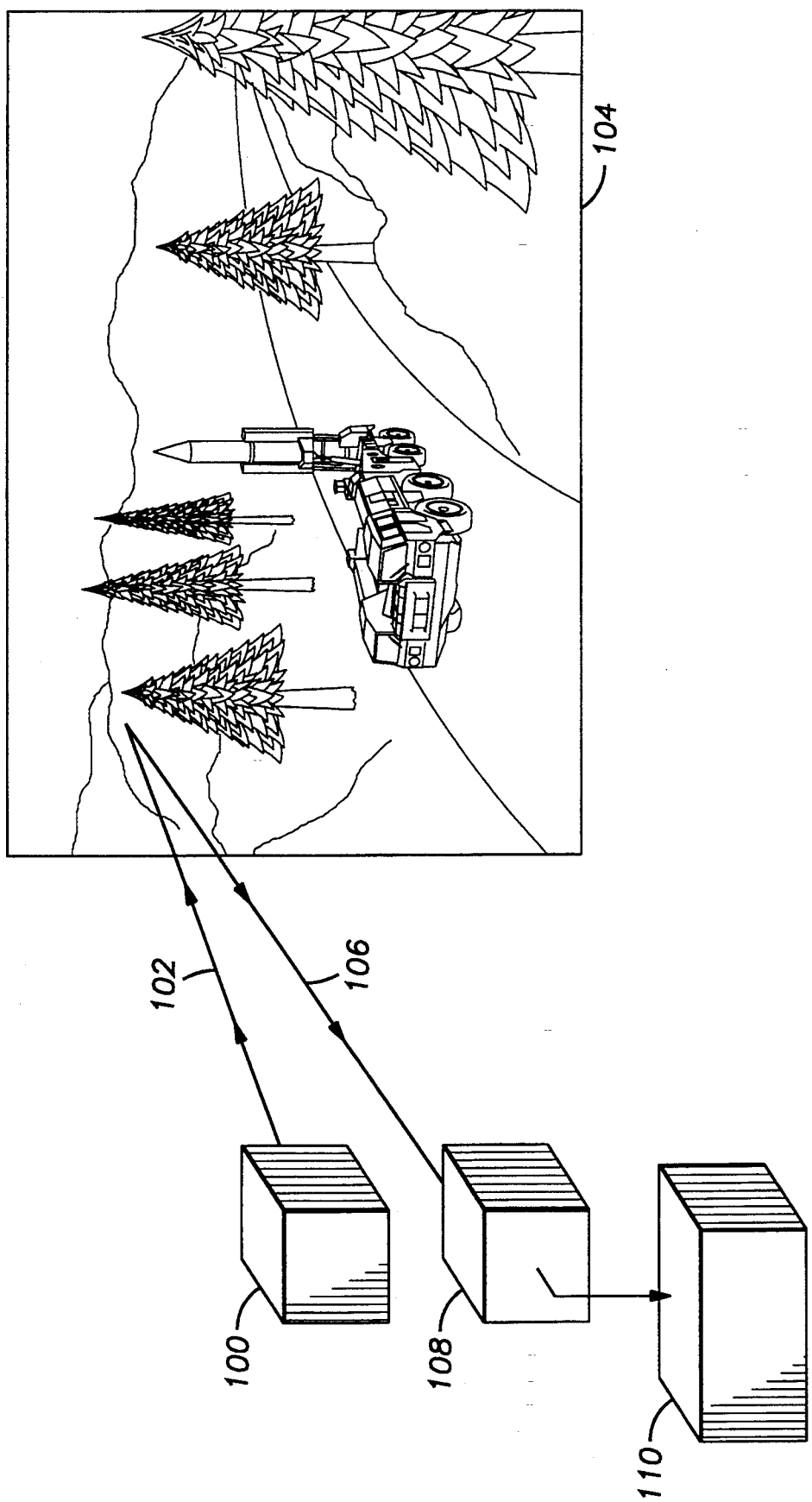
FIG. 1 is an illustration of a LADAR system for scanning a target scene 104 in accordance with the present invention.

In accordance with a preferred embodiment of the invention (FIG. 1), a light source 100 generates a laser light beam 102, and scans the beam 102 across a target scene 104 in a predetermined pattern. The pattern may comprise a raster, a star sequence, a circular sequence, or another suitable pattern that adequately scans the target scene 104. The beam 102 is reflected in a number of directions by objects or by the terrain of the scene 104; some of the reflections are directed at detecting optics 108. For example, when the beam 102 is in the position shown in FIG. 1, one of the reflections is a beam 106, which is sensed by light detecting optics 108. Although the light source 100 and detecting optics 108 may comprise a number of different known LADAR arrangements, a preferred system is that disclosed in U.S. application Ser. No. 724,748 ('748), entitled "Gate Array Pulse Capture Device" filed Jul. 2, 1991 in the name of Flockencier. The entire '748 application is hereby incorporated by reference. The light detecting optics 108 produce an electrical representation of the reflected beam 106, which is stored by a processor 110 in accordance with one or more known methods. The electrical representation produced by the detecting optics 108 may be processed further by the processor 110, or alternatively, by an off-site processor (not shown) such as a personal computer, a minicomputer, or another suitable computing device.

Operation

In an exemplary embodiment, the LADAR system of the invention produces an image representative of three-dimensional target scene 104 by performing a sequence of events such as the following: the laser light source 100 scans the target scene 104, the light detecting optics 108 sense light signals reflected by the target scene 104, and the processor 110 stores the detected signals.

Figure 3:
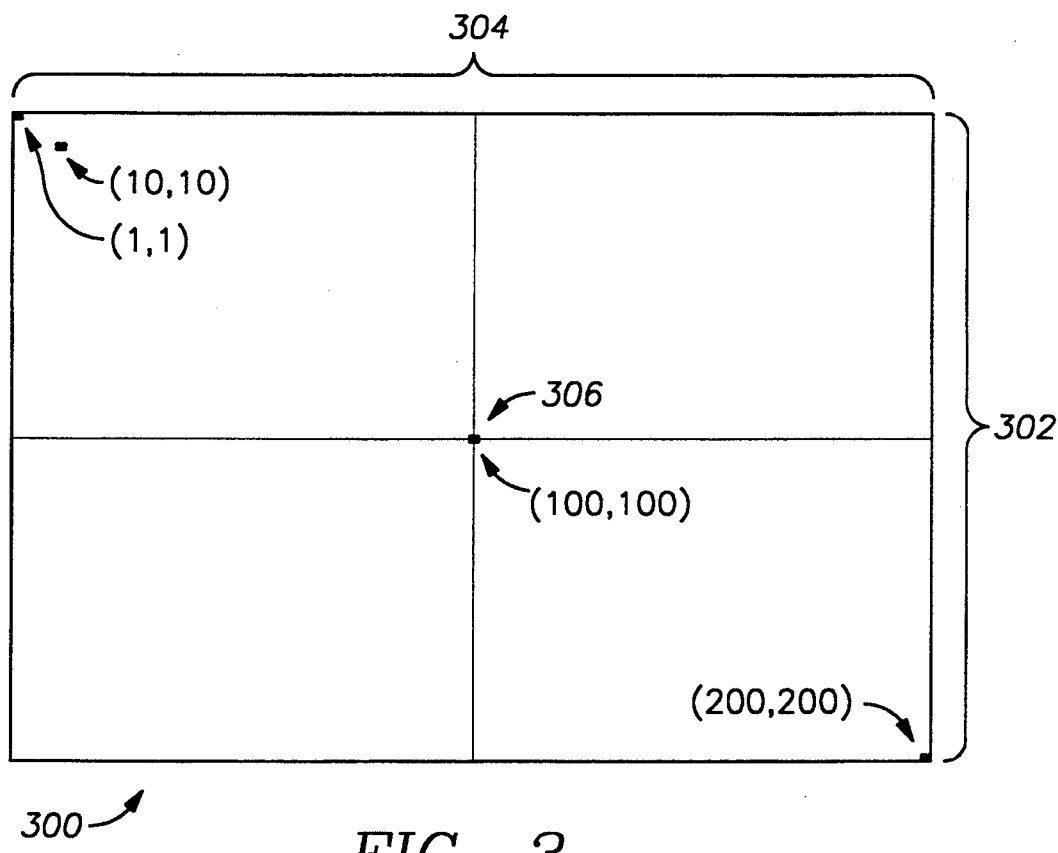
FIG. 3 is a diagram of a processed image received by a processor 110 in accordance with the present invention.

Preferably, the detected signals are stored in an array 300 that comprises a plurality of data elements arranged in rows 302 and columns 304 (FIG. 3). The address of each data element is designated by its row and column numbers. For example, the address of a central data element 306 is the coordinate of (row$_{center}$,column$_{center}$); if the array contains 200 rows and 200 columns, (row$_{center}$,column$_{center}$) is (100,100). Each data element corresponds to a specific point in the target scene 104— therefore, each data element's row and column numbers link that data element to a specific point in the target scene 104, and each data element's contents specify the range of that specific point. In an exemplary embodiment, a data element's range comprises "direct-range," defined as the distance between the light detecting optics 108 and the specific point represented by the data element. The contents of each data element may additionally include the intensity of light reflected from the specific point represented by that data element. Since processors capable of graphically representing scanned data in such arrays are already known, the steps involved in constructing the array will not be discussed.

Generally, the invention operates to sequentially analyze each data element of the array 300 with respect to its neighboring data elements to identify the "flat" objects in the scene 104 that are also "orthogonal" to the detecting optics 108. An object is "flat" if its surface resembles a plane, and the surface is "orthogonal" to the detecting optics 108 if there are sufficiently similar ranges between the detecting optics 108 and numerous points on the surface. When a group of neighboring data elements has a nearly constant range, this tends to suggest a flat, orthogonal surface.

Recognizing flat, orthogonal surfaces is especially useful in target recognition applications, such as missile guidance systems. Generally, most objects in nature are not flat—trees, animals, clouds, and most other natural objects are characterized by curved, rough, or otherwise irregular surfaces. Therefore, in target recognition applications, recognizing flat surfaces is a key issue. However, a few notable surfaces in nature are largely flat. In particular, the earth's surface is flat in some regions, and on calm days, the surface of a body of water may be flat. Therefore, to avoid falsely interpreting such surfaces as flat targets, an additional criterion is helpful. In particular, it has been discovered that additionally requiring target surfaces to be orthogonal to the viewer results in more accurate target recognition.

This obviously may pose a problem when the detecting optics 108 are aimed straight down toward the earth, since a flat region of earth would then be detected as a flat, orthogonal surface. In most target recognition applications, however, the LADAR system is aimed largely parallel to the earth, in order to scan the horizon for possible targets. In these cases, the search for flat, orthogonal surfaces may be especially important and effective to identify potential targets.

Figure 2A:
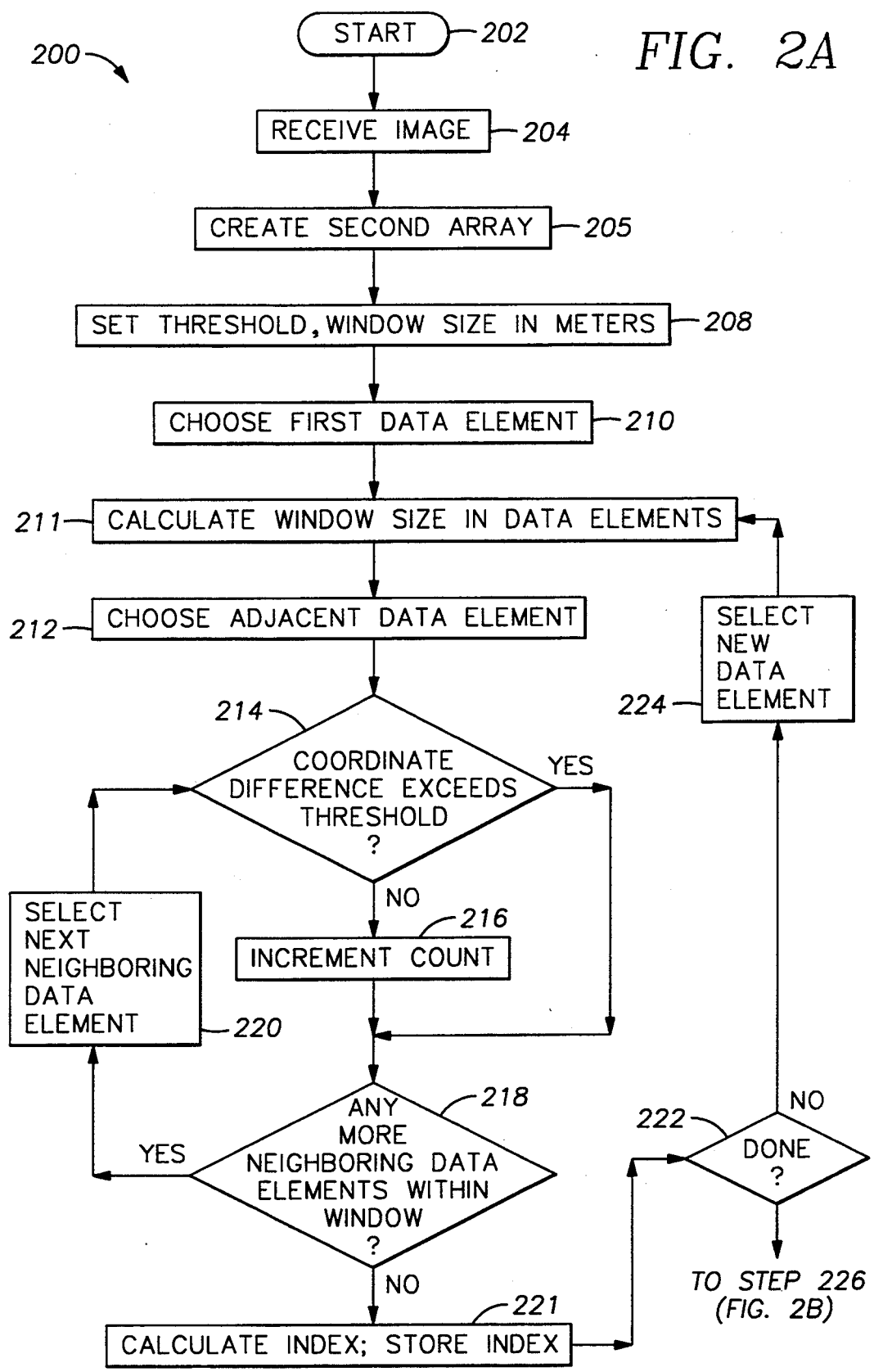
FIG. 2A is a flowchart (first page) of the Main Program of the present invention.
Figure 2B:
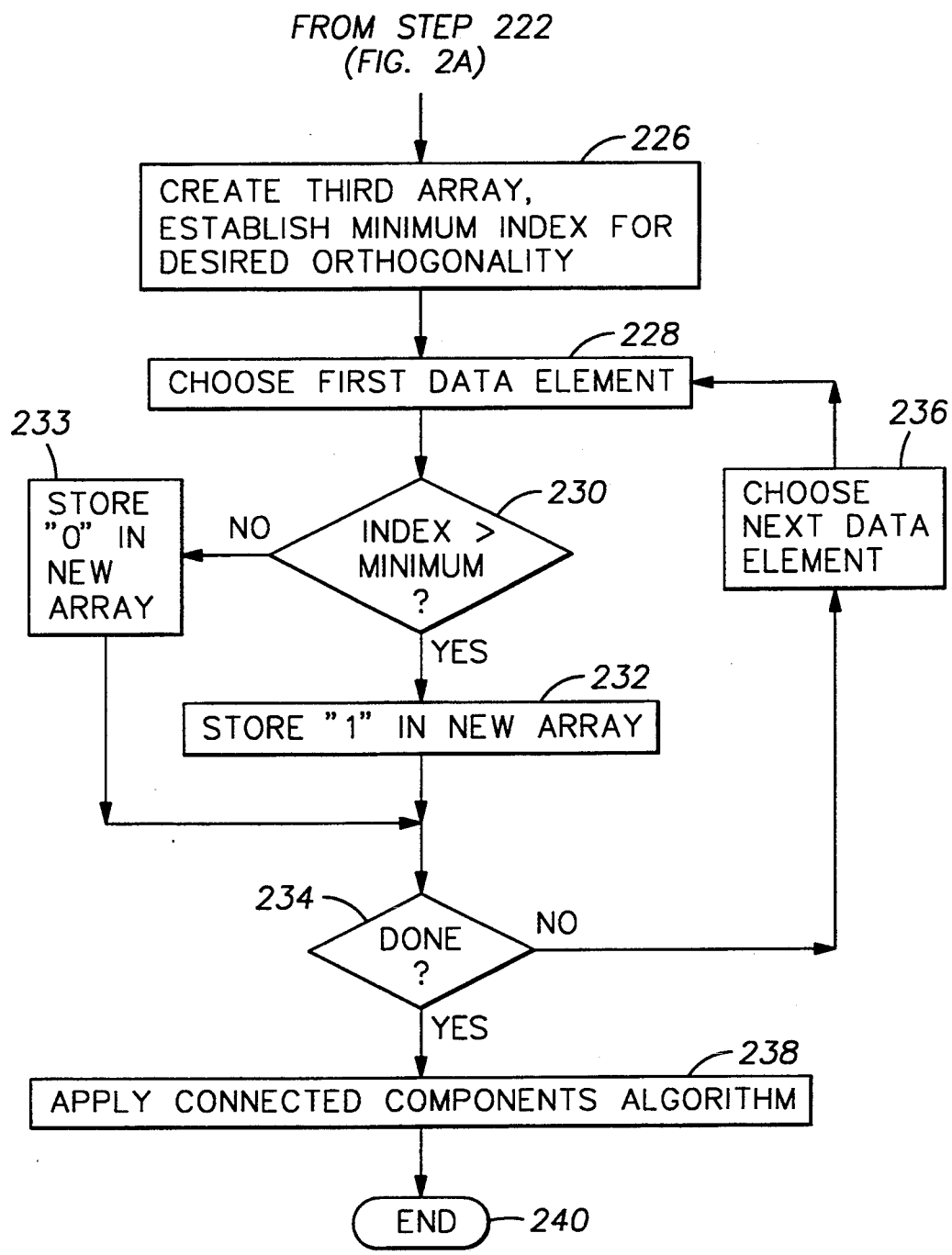
FIG. 2B is a flowchart (second page) of the Main Program of the present invention.

The method of the invention may be implemented using the processor 110 or another computing device (not shown) to execute a routine that, in an illustrative embodiment, may comprise a Main Program that includes a series of tasks 200 (FIGS. 2A–2B). The tasks 200 may also be embodied by a number of FORTRAN language programming lines, which are shown in order of execution in an attached Appendix, the contents of which are hereby incorporated by reference. The tasks 200 sequentially advance through all of the data elements in the array 300, analyzing each data element by comparing its range to the ranges of neighboring data elements. This process helps to identify flat, orthogonal surfaces of the target scene 104, which are represented in the array 300.

After the Main Program is initiated in task 202, an image is received from the processor 110 in task 204. Next, task 205 creates a second array (not shown). The second array is useful since, during the tasks 200, calculations are performed based on the data elements of the original array 300, and the calculated values are stored in the second array. After task 205, task 208 permits a user to set a threshold for determining whether two neighboring data elements have substantially the same range. Task 208 also permits the user to designate the number of neighboring data elements to be compared to each data element under analysis. In an illustrative embodiment, the user designates a window size in square meters, to be theoretically applied to the target scene 104. The window is theoretically applied to the target scene 104 to define which data elements will be compared to the data element under analysis; the window's center is the point in the target scene 104 represented by the data element under analysis. For example, a 1 meter by 1 meter window may be applied to the target scene 104, and the data element under analysis compared to the data elements representing the 1 square meter of the target scene 104 in the window. In an alternative embodiment, the user may be permitted to designate a window size by specifying the number of data elements in the window, e.g. a window size of 10 by 10 data elements. With either embodiment, selecting a larger window causes each data element to be analyzed against more neighboring data elements; with larger windows, the data elements of the array 300 are analyzed more strictly for flatness. Conversely, by selecting a smaller window, each data element is analyzed against fewer neighboring data elements, and the tasks 200 will deem a surface to be flat with a higher tolerance for curvature, roughness, or other irregularity.

Task 210 selects a first data element to process (the data element "under analysis"); this selection may be made arbitrarily, e.g., top left corner, center, etc. Task 211 then calculates the number of data elements in the window, based on the window size entered in task 208. As explained above, the window size (in meters) is constant (e.g., 2×3 meters or 1×1 meters), regardless of the range of the data element under analysis. Thus, for nearer data elements, the window corresponds to more data elements (the data elements corresponding to the window are called "neighboring data elements" to the data element under analysis). Conversely, for data elements with a greater range, the window includes a lesser number of neighboring data elements. After task 211, task 212 chooses one of the neighboring data elements for comparison to the data element under analysis. The neighboring data element selected in task 212 may be selected arbitrarily. Query 214 then asks whether the difference in ranges between the data element under analysis and the neighboring data element selected in task 212 exceeds the threshold set in task 208. If so, this means that the two data elements are not likely to represent points on a flat surface. In this case, control is passed to query 218. However, if it appears that the first data element and the neighboring data element have substantially the same range, task 216 increments a counter.

Query 218 asks whether there are any remaining neighboring data elements to be analyzed. If so, task 220 selects another, unanalyzed data element, and returns to query 214. After all neighboring data elements have been analyzed, task 221 calculates an "index" according to Equation 1 (below).

$$\frac{\text{number of neighboring data elements within threshold}}{\text{number of neighboring data elements}} \quad [1]$$

The index will be 1 if the difference in range between the data element under analysis and all neighboring data elements is less than the threshold. Otherwise, the index will be less than 1, e.g. 0.5, 0.75, 0.375, etc. Additionally in task 221, the calculated index is stored in the second array, in the address corresponding to the address of the data element under analysis.

After calculating and storing the index in task 221, query 222 asks whether all data elements in the array 300 have been processed by the steps 211–220. If not, task 224 selects another data element to process, and returns to task 211.

When query 222 determines that all data elements of the array 300 have been processed, control is passed to task 226 (FIG. 2B). At this point, if desired, the data elements of the second array may be visually displayed, on a graphics monitor for example. If different index numbers are assigned different brightness and/or color values, the flat, orthogonal surfaces stand out. These surfaces are represented by data elements having index values of 1 or near 1.

Task 226 creates a third array (not shown), to be used in identifying surfaces having a selected level of orthogonality. This is done by sequentially examining the indices stored in the second array, and identifying those indices that exceed a selected minimum index. The minimum index, as described below, is used to establish a "cutoff," below which data elements will be considered to be non-orthogonal. Accordingly, task 226 permits the user to select a minimum index to evaluate the indices stored in the second array. For example, the user may specify a minimum index of 0.75, so that all data elements having an index of 0.75 or greater will be deemed to be part of a flat, orthogonal surface.

Figure 4:
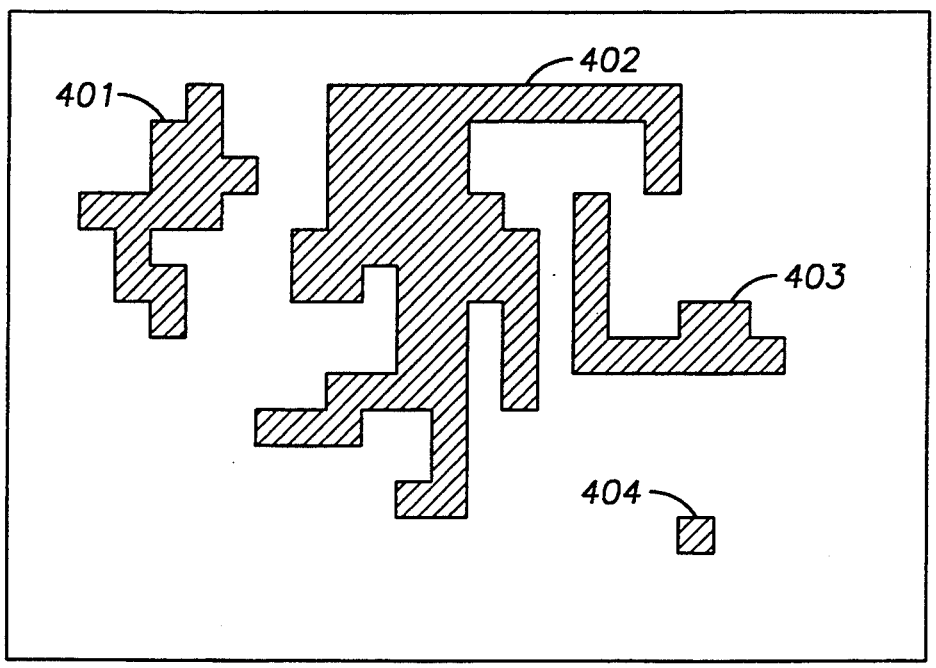
FIG. 4 is a diagram illustrating the operation of a Connected Components algorithm.

In task 228, an index stored in the second array is arbitrarily selected for examination; the address of this index may be selected arbitrarily, e.g., top left corner, center, etc. Query 230 then asks whether the index of the selected data element is greater than the minimum index selected in task 226. If so, task 232 stores a "1" in the third array, in an address corresponding to the address of the index in the second array. If the answer to query 230 is no, task 233 stores a "0" in the third array. FIG. 4 depicts a visual representation of the contents of an exemplary third array.

Until query 234 determines that all elements of the second array have been processed, query 234 directs control to task 236 to select and process another index of the second array. When query 234 determines that all indices of the second array have been processed, task 238 applies a "Connected Components" algorithm to the third array to determine which of the orthogonal elements, now stored in the third array, are connected.

Generally, Connected Components algorithms identify groups of data elements that are associated with each other, i.e. data elements that represent a contiguous object. For example, in FIG. 4, groups 401, 402, 403, and 404 of data elements are identified as "connected components." Task 238 preferably utilizes the Connected Components algorithm described in U.S. patent application Ser. No. 07/724,901, entitled "Target Classifying Technique," filed Jul. 2, 1991 in the names of Nettles and Han (now abandoned). The disclosure of this application is hereby incorporated by reference in its entirety. However, task 238 may apply any one of a number of different known Connected Components algorithms instead. Some examples are discussed in the following materials:

(1) A. Rosenfeld & A. Kak, *Digital Picture Processing* (volume 2), (2d edition), page 241;
(2) U.S. Pat. No. 4,624,013, entitled "Linked Component Extraction Circuit for Image Processor" in the name of Urushibata;
(3) U.S. Pat. No. 4,791,676, entitled "Method and Means for Efficiently handling Boundary Conditions in Connected Component Labeling," in the names of Flickner et al; and
(4) U.S. Pat. No. 4,630,306, entitled "Apparatus and Methods for Coding and Storing Raster Scan Images," in the names of West et al.

Testing

Figure 6:
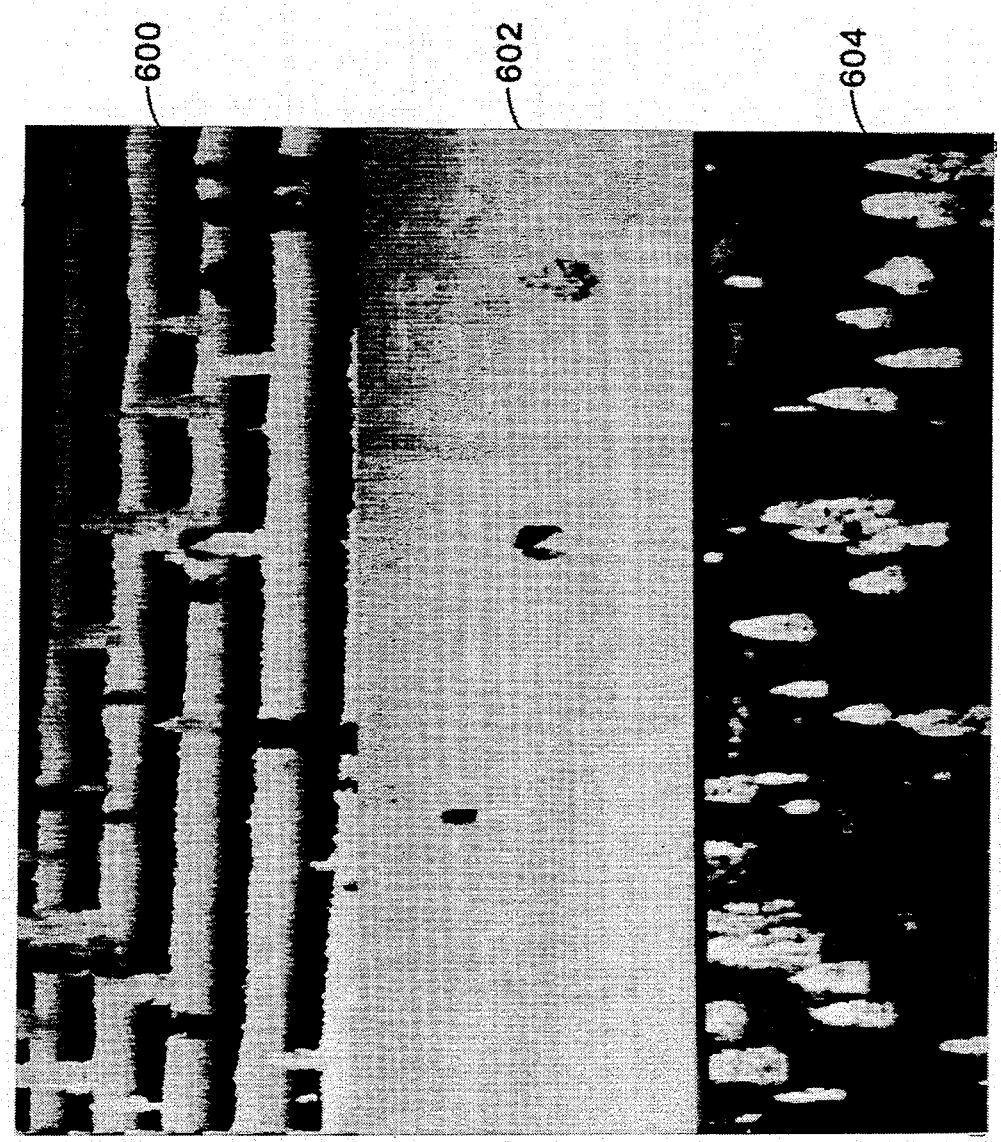
FIG. 6 shows graphical representations that illustrate exemplary outputs of the invention.

A field test was conducted with the results shown in photographs 600, 602, and 604 (FIG. 6). In particular, the photograph 600 illustrates "raw" range values, typical of those that might be calculated by the processor 110 using data from the detecting optics 108, without any further testing or analysis. Photograph 602 depicts the output of a typical "passive system," which simply depicts the ambient light reflected by the target scene 104.

In contrast to the passive system of the photograph 602, or the raw range values of the photograph 600, the photograph 604 illustrates the indices calculated in accordance with the present invention. The photograph 604 is typical of the indices stored in the second array in task 221. The objects of the target scene represented in the photograph 604, most of which are trees, are easily distinguished from the background; in particular, the trees are shown in gray or white, and the background is shown in black.

It is apparent that the present invention provides its users with a number of advantages. For example, the invention utilizes a LADAR ranging system to more accurately locate man-made structures by identifying flat surfaces. Further, the invention helps to avoid erroneous results since it also requires the flat surfaces to be orthogonal to the detecting optics 108 of the LADAR system.

Another advantage of the invention is its insensitivity to noise. Unlike slope-based techniques, noisy data elements in the array 300 will not skew analysis of the array 300. In particular, the only effect a neighboring noisy data element will have on a non-noisy data element under analysis is that the count of the data element under analysis will not be incremented in task 216 for the noisy data element. Moreover, the noisy data element can be easily recognized and discounted, since its index, after being compared to its neighboring data elements, will be 0.

While there have been shown what are presently considered to be preferred embodiments of the invention, it will be apparent to those skilled in the art that various changes and modifications may be made herein without departing from the scope of the invention as defined by the appended claims. For example, the window size established in task 211 need not be in meters- the window's size may be selected using feet, inches, centimeters, or another unit of measurement that is convenient.

Also, a modification of the tasks 200 is contemplated for certain applications with close-range targets, or wide fields of view. In that regard, the method of FIGS. 2A-2B is calculated to be most accurate under two basic conditions: (1) when the field of view is assumed to be small, and (2) when the distance between the detecting optics 108 and the targets (i.e. the "direct-range") is assumed to be large. In most applications, these conditions are met: the array 300 usually corresponds to an angle of 20° or less, and the LADAR system is used with targets that are located at a substantial direct-range from the detecting optics 108.

However, under other conditions, all points on a flat, orthogonal object cannot be assumed to be the same direct-range from the detecting optics 108. In these circumstances, the routine of FIGS. 2A-2B is modified by utilizing "normal-range" instead of "direct-range," where "normal-range" is defined as the minimum distance between the detecting optics 108 and a plane passing through the target that is normal to a line between the detecting optics 108 and a focus point 502 in the target scene 104. The focus point 502, in an exemplary embodiment, may be a point of the target scene 104 at which the detecting optics 108 are focused. Or, the focus point 502 may be another convenient reference point in the target scene 104.

Figure 5:
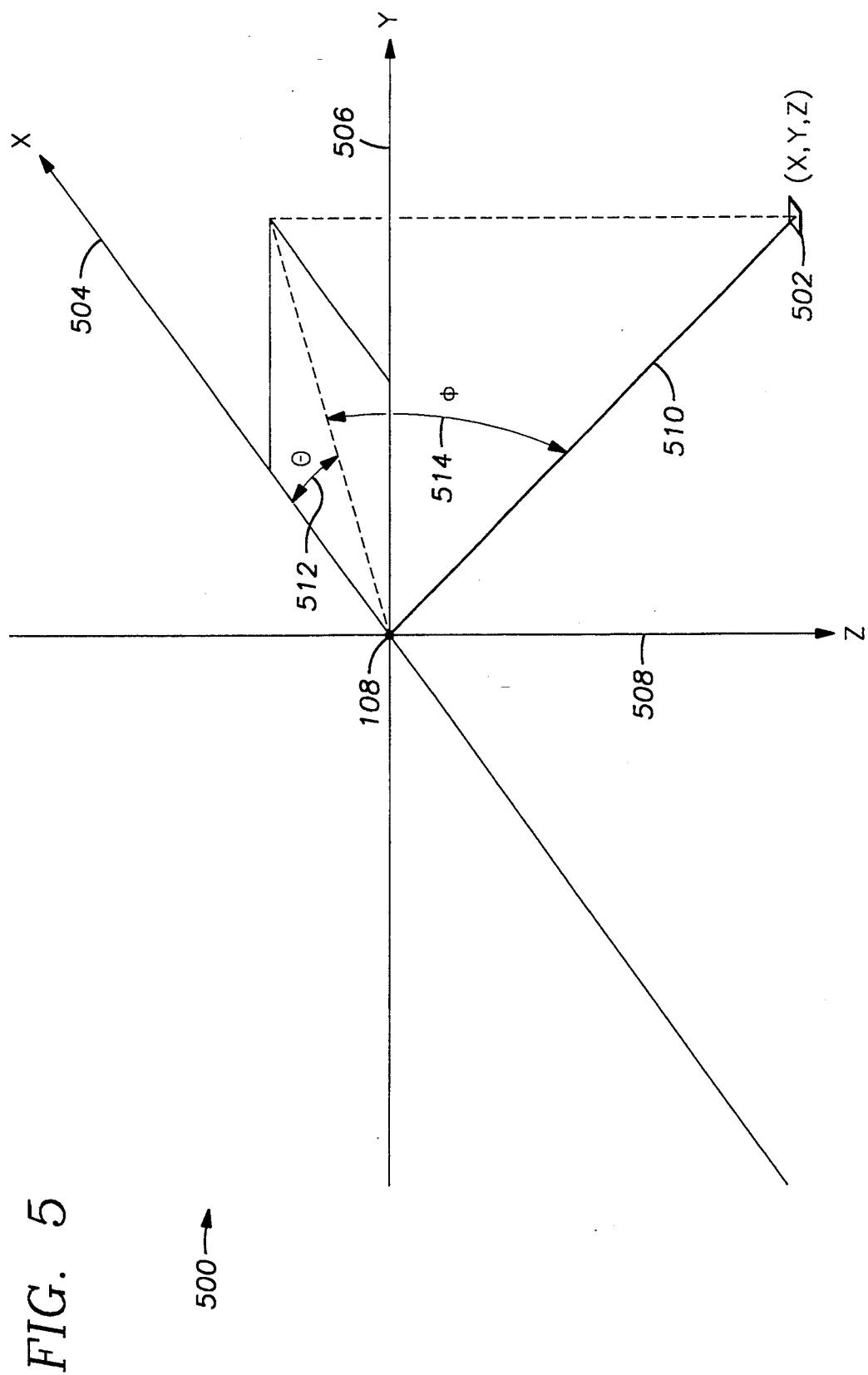
FIG. 5 is a diagram of a modification of the invention intended for certain applications.

FIG. 5 shows the position of the detecting optics 108 in relation to a focus point 502 and a Cartesian coordinate system 500 having an x-axis 504, a y-axis 506, and a z-axis 508. The Cartesian coordinate system 500 is oriented such that the x-axis 504 and the y-axis 506 are horizontal and perpendicular to each other; the z-axis is vertical, and perpendicular to both the x-axis 504 and the y-axis 506.

The direct-range of the focus point 502 is the length of a line 510 that extends directly from the detecting optics 108 to the focus point 502. The modification illustrated in FIG. 5 involves converting the direct-range values of the array 300 into normal-range values that correspond to the minimum distance between the detecting optics 108 and a plane that passes through the focus point 502 and is normal to the line 510. For the focus point 502 itself, the direct range and normal-range are the same. However, for other points in the target scene 104, these values will differ.

The conversion between direct-range and normal-range may be performed, after receiving the array 300 in task 204, by replacing the direct-range values in the array 300 with normal-range values. This operation may be effected according to Equation 2 (below).

$$R_2 = R_1 \cdot \cos \Phi \cdot \cos \Theta \qquad [2]$$

where,
- $R_1$ is the direct-range between the detecting optics 108 and data element to be converted;
- $R_2$ is the normal-range between the detecting optics 108 and the data element to be converted;
- $\Theta$ is an "azimuth angle" 512 between the line 510 a plane that includes the x-axis 504 and the z-axis 508; and
- $\Phi$ is a "depression angle" 514 between the line 510 and a plane that includes the x-axis 502 and the y-axis 506.

Therefore, using the modification of FIG. 5, the accuracy of the invention is increased for applications with close-range targets, or wide fields of view.

APPENDIX

COPYRIGHT (C) 1993, LORAL VOUGHT SYSTEMS CORPORATION

```
      subroutine rcluster (rng,det,nrows,ncols,hres,vres,rres)
      implicit none
c
c     Rng          -   integer range image                      - input
c     Det          -   detection image                          - output
```

```
c     Nrows      -     nrows of image                        - input
c     Ncols      -     ncols of image                        - input
c     Hres       -     horizontal resolution (radians)       - input
c     Vres       -     vertical resolution (radians)         - input
c     Rres       -     range resolution (meters/bit)         - input integer*4 nrows,ncols,row,col,srow,erow,scol,ecol
      integer*2 rng(nrows,ncols),det(nrows,ncols)
      integer*4 irng
      integer*4 rcl_minrange,rcl_maxrange
      parameter (rcl_minrange=100,rcl_maxrange=1500)
      real*4 rcl_halfheight,rcl_halfwidth
      parameter (rcl_halfheight=0.5,rcl_halfwidth=0.5)
      real*4 rcl_depth,rcl_percent
      parameter (rcl_depth=1.0,rcl_percent=0.70)

integer*4 rowoffset(rcl_minrange:rcl_maxrange)
      integer*4 coloffset(rcl_minrange:rcl_maxrange)
      integer*4 ntot(rcl_minrange:rcl_maxrange)
      integer*4 out,rthresh,dif
      real*4 hres,hres,rres,srng
      real*4 dy,dx c
c     Set up tables needed for subsequent processing
c rthresh=ifix(rcl-depth/rres+0.5)

c     Loop through range for lookup table values do i=rcl_minrange,rcl_maxrange
      dy=float(i) *yres c
c     Rowoffset is the row displacement for the window
c
      rowoffset(i)=ifix(rcl_halfheight/dy)
      rowoffset(i)=max(rowoffset(i),1)
      dx=float(i)*xres c
c     Coloffset is the col displacement for the window
c
      coloffset(i)=ifix(rcl_halfwidth/dx)
      coloffset(i)=max(coloffset(i),1)
      ntot(i)=2*(rowoffset(i)+1)*(coloffset(i)+1)

c     Ntot is the number of pixels used in the window at range
i
c     calculate the threshold value - for this number of pixels
c     at this range.

ntot(i)=ifix((rcl_percent)*float(ntot(i))+0.5)

end do do col=1,ncols
      do row=1,nrows
      det(row,col)=0
      end do
      end do
```

```
      do col=2,ncols-1
      do row=2,nrows-1
      if(rng(row,col).gt.0) then
c
c     Determine range value into lookup table = quantized range x
range
c     resolution
c
         srng=float(rng(row,col))*rres
         irng=ifix(srng)
         if(irng.ge.rcl_minrange.and.irng.le,rcl_maxrange) then
c
c     Determine row start and end for box
c
         srow=row-rowoffset(irng)
         erow=row+rowoffset(irng)

if(srow.ge.1.and.erow.le.nrows) then c
c     Continue only if entire box is within frame
c c
c     Determine column start and end
c
            scol=col-coloffset(irng)
            ecol=col+coloffset(irng)

if(scol.ge.1.and.ecol.le.ncols) then out=0
               do c=scol,ecol
               do r=srow,erow
               dif=abs(rng(r,c)-r(row,col))
               if(dif.le.rthresh) out=out+1
               end do
               end do c     Subtract pixel matching itself.
c
               out=out-1
               if(out.ge.ntot(irng)) det(row,col)=1 endif endif endif endif end do
      end do return end
```

COPYRIGHT (C) 1993, LORAL VOUGHT SYSTEMS CORPORATION

What is claimed is:

1. A method of identifying flat orthogonal surfaces, comprising steps of:
    (a) transmitting energy signals toward a target scene;
    (b) detecting energy signals reflected from the target scene using light detecting optics;
    (c) using the detected energy signals to determine ranges between the light detecting optics and a plurality of points in the target scene;
    (d) storing the ranges in a plurality of data elements of a first memory array; and
    (e) sequentially processing the data elements by, for each data element under analysis, performing steps comprising:
        (1) comparing the range of a data element under analysis to the ranges of a selected number of neighboring data elements; and
        (2) for each neighboring data element having a range within a predetermined threshold of the data element under analysis, incrementing an index corresponding to the data element under analysis.

2. The method of claim 1, wherein step (e)(1) comprises steps of comparing the range of a data element under analysis to the ranges of a group of neighboring data elements representing a region in the target scene have a selected size.

3. The method of claim 1, further comprising steps of creating a second memory array that includes a plurality of data elements corresponding to the indices, where each data element of the second array contains a first value if its corresponding index is greater than a selected number, and each data element of the second array contains a second value if its corresponding index is less or equal to the selected number.

4. The method of claim 3, wherein the first value is 1.

5. The method of claim 3, wherein the first value is zero.

6. The method of claim 3, further comprising a step of performing a Connected Components algorithm on the data elements of the second array.

7. The method of claim 1, further comprising steps of storing the indices in a second memory array.

8. The method of claim 1, wherein the range of a data element comprises the distance between the light detecting optics and a point in the target scene represented by the data element.

9. The method of claim 1, wherein the range of a data element comprises the minimum distance between the light detecting optics and a plane passing through a point in the target scene represented by the data element, wherein said plane is normal to a line between the detecting optics and a focus point in the target scene.

10. A method of identifying orthogonal flat surfaces, comprising steps of:
    (a) transmitting energy signals toward a target scene;
    (b) detecting energy signals reflected from the target scene using light detecting optics;
    (c) using the detected energy signals to determine direct-ranges of a plurality of points in the target scene, wherein the direct-range of each point corresponds to the distance between that point and the light detecting optics;
    (d) utilizing the direct-ranges to the points to calculate each point's normal-range, where the normal-range of each point corresponds to the minimum distance between the light detecting optics and a plane that passes through the point, wherein the plane is orthogonal to a line between the light detecting optics and a focus point in the target scene;
    (e) storing the normal-ranges in a plurality of data elements of a memory array; and
    (f) sequentially processing the data elements by, for each data element under analysis, performing steps comprising:
        (1) comparing the normal-range of a data element under analysis to the normal-ranges of a selected number of neighboring data elements; and
        (2) for each neighboring data element having a normal-range within a predetermined threshold of the data element under analysis, incrementing an index corresponding to the data element under analysis.

11. A method of identifying orthogonal flat surfaces, comprising steps of:
    (a) transmitting energy signals toward a target scene;
    (b) detecting energy signals reflected from the target scene using light detecting optics;
    (c) using the detected energy signals to determine normal-ranges of a plurality of points in the target scene, where the normal-range of each point corresponds to the minimum distance between the light detecting optics and a plane that passes through the point, wherein the plane is orthogonal to a line between the light detecting optics and a focus point in the target scene;
    (d) storing the normal-ranges in a plurality of data elements of a memory array;
    (e) sequentially processing the data elements by, for each data element under analysis, performing steps comprising::
        (1) comparing the normal-range of a data element under analysis to the normal-ranges of a selected number of neighboring data elements; and
        (2) for each neighboring data element having a normal-range within a predetermined threshold of the data element under analysis, incrementing an index corresponding to the data element under-analysis.

12. A method of detecting generally flat and orthogonal surfaces in a target scene, comprising steps of:
    (a) ranging a target scene with a laser and a detection system to generate a first array of reflected signals, said first array being indicative of ranges and locations of reflection points of the reflected signals in the target scene; and
    (b) comparing the ranges of individual reflection points with their neighboring reflection points and assigning an index value to each said individual reflection point, which value is a function of the number of reflection points neighboring the said individual reflection point that have ranges within a preselected threshold value of the range of said individual reflection point.

13. The method of claim 12, further comprising steps of storing the indices in a second array.

14. The method of claim 12, further comprising a step of generating a second array indicative of the locations in the target scene of those individual reflection points having index values of at least a preselected index value.

* * * * *